(12) United States Patent
Fukae et al.

(10) Patent No.: US 6,219,596 B1
(45) Date of Patent: Apr. 17, 2001

(54) AUTOMATED HIGHWAY TRACKING AND COMMUNICATION SYSTEM AND METHOD

(75) Inventors: Tadamasa Fukae; Norihiro Tamiya; Toyofumi Tani; Tadatomi Ishigami; Yoshihiko Utsui, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/933,107

(22) Filed: Sep. 18, 1997

(51) Int. Cl.[7] ........................................ G01S 3/02
(52) U.S. Cl. ......................... 701/23; 180/169; 342/450
(58) Field of Search ............................ 701/23, 117, 207; 342/42, 44, 51, 52, 56, 450, 451; 180/167, 168, 169; 340/991, 992, 993, 901

(56) References Cited

U.S. PATENT DOCUMENTS

| | | | |
|---|---|---|---|
| 4,361,202 | * | 11/1982 | Minovitch .............................. 180/168 |
| 4,729,660 | * | 3/1988 | Tsumura et al. ........................ 701/23 |
| 4,855,915 | * | 8/1989 | Dallaire ................................... 701/23 |
| 5,126,941 | * | 6/1992 | Gurmu et al. ........................ 340/992 |
| 5,128,669 | * | 7/1992 | Dadds et al. ......................... 340/901 |
| 5,150,310 | * | 9/1992 | Greenspun et al. ................. 342/451 |
| 5,196,846 | * | 3/1993 | Brockelsby et al. ................... 342/42 |
| 5,318,143 | * | 6/1994 | Parker et al. .......................... 701/23 |
| 5,357,432 | * | 10/1994 | Margolis et al. ..................... 180/169 |
| 5,369,591 | * | 11/1994 | Broxmeyer ........................... 180/167 |
| 5,420,794 | * | 5/1995 | James .................................... 340/991 |
| 5,812,267 | * | 9/1998 | Everett, Jr. et al. ................. 180/169 |
| 5,875,408 | * | 2/1999 | Bendett et al. ....................... 180/169 |

OTHER PUBLICATIONS

Fukae et al., "Lateral Distance Measurement Using Optical Spread Spectrum Radar", Jul. 19, 1997.*

* cited by examiner

*Primary Examiner*—Gary Chin

(57) ABSTRACT

A vehicle borne transmitter transmits a spread spectrum transmit signal which is pseudo (PN) encoded. The transmitted signal is reflected off of a reflector on known position which may be a highway guardrail, tunnel wall, or the like. The reflected signal is detected by a receiver in the vehicle and a pseudo noise code (PN code) is synchronized to the reflected signal to accomplish maximum correlation. The phase delay between the transmitted PN code and received PN code is thereby utilized to determine the distance between the vehicle and reflector to maintain the vehicle in the center of a roadway lane. Roadway transponders may be periodically located adjacent the roadway and will be responsive to the vehicle borne interrogation signal. The periodically located transducers produce a reply signal including a PN code and imbedded data which data may represent transponder ID and position, roadway or map data, or other data which is desirable to transmit between the transducer and the vehicle travelling the highway.

17 Claims, 4 Drawing Sheets

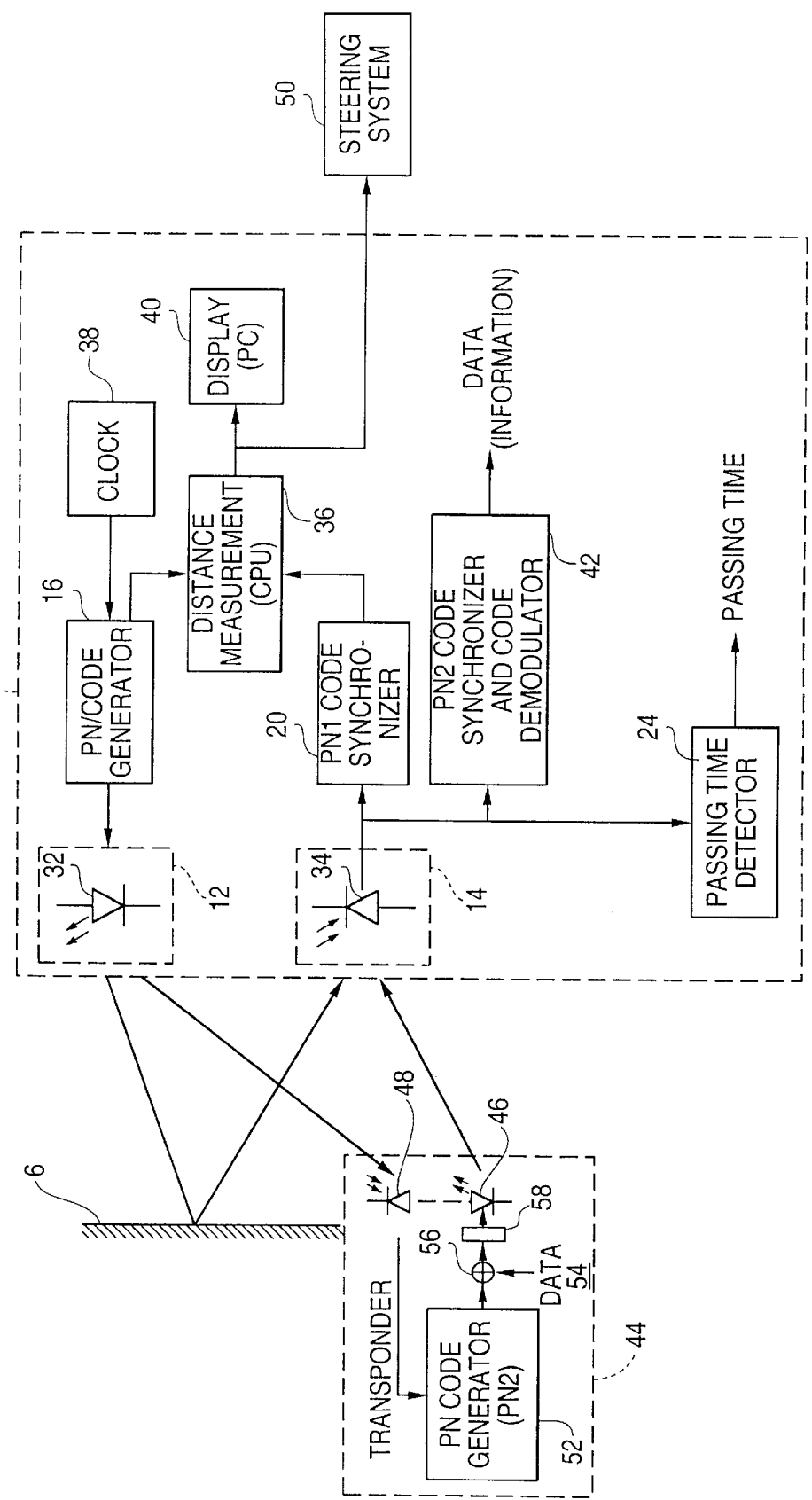

AUTOMATED HIGHWAY TRACKING AND COMMUNICATION SYSTEM AND METHOD

FIELD OF INVENTION

The present application is directed to a system and method for determining the position of a vehicle on a highway. The system and method of the present application is further directed to a system and method for determining the location of a vehicle on the highway while simultaneously providing a communication link between a so-called intelligent transportation system and the vehicle.

BACKGROUND OF THE INVENTION

There has been an increasing recognition throughout the world that highway traffic is becoming an increasing problem, both from the standpoints of highway congestion and safety. One solution to this problem is to dramatically increase the number of highways to thereby decrease highway congestion. However, considerable expense is associated with the development of new highways and such new highways demand that an increasing percentage of land be utilized to support such highways, thereby decreasing the efficiency of a society's land utilization. Furthermore, in congested areas, there is little realistic opportunity to construct new highways, as no additional space exists. Accordingly, there is a need to make current highways more efficient.

There have been several recent proposals to develop an intelligent highway system which would allow both increased highway safety and higher highway utilization. One proposal for such an intelligent highway system is to automatically monitor and control the position of each vehicle along the highway, enabling the control of vehicle following distances and braking profiles to increase highway safety while reducing the vehicle spacing requirements otherwise necessary with individual vehicle operator control.

In such automated highway systems, it is desirable for the roadway and/or each vehicle to monitor its longitudinal position along the roadway. Further, in such systems, automated lane tracking may be considered desirable.

In such automated highway systems, it is further desirable to supply each vehicle and the operator thereof with highway originated information of various types. For example, it may be desirable to provide the operator of each vehicle with traffic jam information, regulatory information, as well as road direction and parking information.

A supplemental advantage of such an intelligent transportation system is that, through interactive control of each vehicle by the highway, less acceleration and braking inputs are necessary, reducing the amount of stop and go traffic and additionally reducing fuel requirements and according decreasing resultant pollution.

One such automated highway system which has been proposed is under development primarily by Nissan Motor Company, Limited with the support of the Japanese Ministry of Construction. Such a system determines a vehicle's lateral placement along the roadway through the use of magnetic nails imbedded down the center of the road bed and monitored by a vehicle born magnetic nail sensor which determines the relative position of the front of the vehicle with respect to the magnetic nails, and seeks to control vehicle position to center the vehicle over the magnetic nails.

In the magnetic nail lateral position measurement system, the magnetic nails have the ability of being locatable virtually anywhere. However, the ability to monitor such magnetic nails is subject to severe degradation in dependence on weather conditions. For example, a snowstorm may make such a lateral position measuring system unusable. Further, the use of such magnetic nails increases the complexity of roadway maintenance. For example, roadway resurfacing encounters significant difficulties when imbedded magnetic nails are present.

In the above-mentioned system, vehicle position longitudinally along the roadway is determined through the use of a global positioning satellite system (GPS). Each vehicle receives GPS signals and decodes them to determine the vehicle's own position. Such a GPS recorded position is integrated with velocity, acceleration, and yaw rate vehicle mounted sensors to produce a kinematic-GPS estimate of vehicle position. In such a kinematic-GPS system, while accurate longitudinal position of the vehicle may be developed, the GPS signals are not available under trees, bridges, or in tunnels, thereby limiting system useability.

The above-mentioned system further utilizes a road-to-vehicle communication system which comprises a vehicle mounted antenna communicating with a leakage coaxial cable installed along the roadway shoulder. However, this communication system must be installed separately from the above-mentioned systems, thus adding to expense.

SUMMARY OF THE INVENTION

The concepts of the present application overcome substantial disadvantages of the known automated highway systems. With respect to lateral vehicle location, the system of the present invention employs a vehicle borne transmitter which transmits a vehicle identifying signal for reflection by a roadside located reflector which, in one preferred embodiment, may function as a highway guardrail or may form part of a tunnel or highway wall or the like. The use of the highway guardrail structure as a lateral position reflector has several advantages. The guardrail is less susceptible to lateral position measurement degradation due to inclement weather such as snow, sleet, rain or the like. Precipitation is more likely to cover the roadway and the magnetic nails embedded therein than it is likely to obstruct the communication path between the guardrail and the vehicle. Accordingly, as compared to road bed mounted magnetic sensors, such a roadside located reflector is less dependent on weather.

A further advantage is obtained through the use of the vehicle transmitted interrogation signal containing a spread spectrum PRN (pseudo-random noise) code. Such spread spectrum PRN codes may be made virtually unique, effectively eliminating the risk that the transmission from a first vehicle will produce a reflection received by a second vehicle.

The system of the present invention additionally proposes to periodically mount longitudinal position transducers along the highway roadside, which transducers will be responsive to the vehicle borne interrogation signal and will produce a reply signal indicative of the vehicles position. Such a longitudinal position system has significant advantages over the known kinematic-GPS system. Firstly, such a system may include roadside sensors mounted in tunnels or in other places where GPS reception would be obscured. Secondly, the interrogations and reflections from the longitudinal position sensors may also be utilized for communication through the use of messages transmitted therewith.

Thus, the longitudinal position system of the present invention also utilizes the same roadside located infrastructure to both determine vehicle position for the benefit of both the vehicle and the roadway system, and to allow the communication of additional messages.

As explained above, the known automated highway system utilizes a leakage coaxial cable and system for such communication. However, this leakage coaxial cable system does not perform any vehicle location function. The longitudinal position detection system of the present application allows the detection of longitudinal position and the communication of imbedded messages between the vehicle and the intelligent transportation system.

It is accordingly apparent that the system of the present invention is substantially improved over the known prior art.

BRIEF DESCRIPTION OF THE DRAWINGS

FIG. 3 is a schematic view of a system such as illustrated in FIG. 2 further including circuitry for communication with roadway mounted transponders.

DETAILED DESCRIPTION OF PREFERRED EMBODIMENTS

Figure 1:
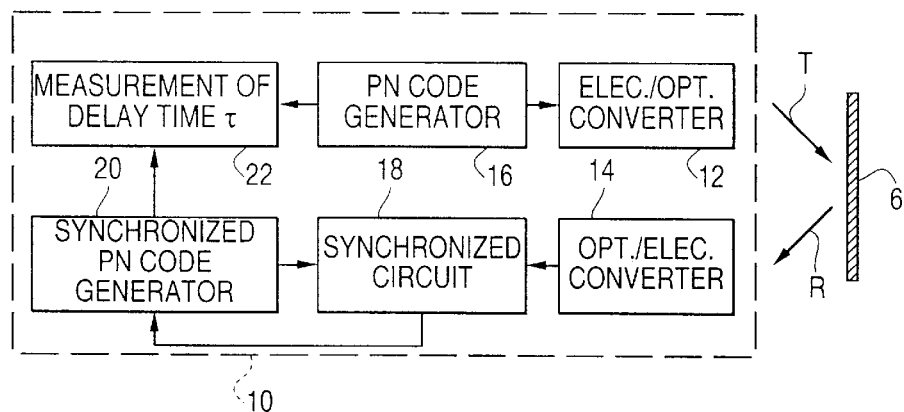
FIG. 1 is a schematic view illustrating one embodiment of the invention of the present application.

The exemplary embodiments of the invention claimed in the appended claims may be more fully appreciated by reference to the following description of preferred embodiments. Within the drawing figures, it should be understood that like elements are identified by like reference numbers.

An exemplary vehicle mounted system is described with reference to FIG. 1 of the instant application. In basic principal, the system of the present application utilizes a vehicle mounted system 10, mounted on a vehicle 4, to transmit an optical or electrical signal along a transmitted path T to a target or reflector 6, which reflects the signal back to the vehicle mounted system 10 along a received path R. By calculating the time delay between transmission and reception, distance between the vehicle mounted system 10 and the target or reflector 6 may be easily ascertained. This simple principle of transmission and receipt of a generated signal reflected off a target 6 is in practice difficult to use in a real world environment.

For example, in a real world roadway, plural vehicles are travelling along the same roadway substantially simultaneously. Thus, in order for the vehicles to safely travel the roadway, it is necessary for the transmitted signal from each vehicle to be identifiable. According to the teachings of the present invention a pseudo-random noise (PR) or (PN) code is utilized. This type of code simulates a random sequence and therefore possesses an auto correlation function which appears substantially uncorrelated when the PN signal is not phase matched with itself while appearing highly correlated when phase matched with itself.

Such codes are typically generated in a known fashion by use of a shift register with linear feedback. In one preferred embodiment of the present application, the PN code is generated by a 7-stage shift register with linear feedback which produces a sequence having a period N=2−1. The vehicle mounted system 10 utilizes a PN code generator 16 of this known type to generate a PN code at least substantially unique to the vehicle on which the system is mounted. This code is modulated by a transmitter or electrical/optical converter 12.

In the case of optics, the intensity of the transmitted light wave produced in accordance with the teachings of the present application is directly modulated by the PN code. A logical "1" turns on the light output while a logical "0" turns off the optical output. Alternatively, the teachings of the present application are also applicable to the use of other radiation wave lengths. For example, in the case of millimeter waves, a carrier may be modulated by the PN code to alternate between 2 different phase states, for example, 0° and 180° to accomplish a type of phase shift keying (PSK).

The optical signal transmitted on the transmitted path T is reflected from the target 6 and redirected toward the vehicle and its associated vehicle mounted system 10 along the received path 10. A receiver or optical/electrical converter 14 receives the received optical signal, which is a delayed form of the originally transmitted PN code. A synchronized circuit 18 and synchronized PN code generator 20 collectively determine the phase delay between the transmitted PN code and the received PN code.

The synchronized circuit 18 compares the received signal to a synchronized PN code which is a selectively delayed example of the PN code generated by the PN code generator 16 used to modulate the optical signal. The synchronized PN code generator 20 may add or subtract a time delay to the PN code, originally generated by the PN code generator 16 in any desired fashion in order to obtain synchronization. For example, the synchronized PN code generator 20 may sequentially add a time delay to the PN code generated by the PN code generator 16 one pulse or chip at a time until maximum correlation is ascertained between it and the received PN modulated signal obtained on the received path. Alternatively, if approximate correlation is known based upon, for example, the immediate proceeding sample, the synchronized PN code generator 20 may selectively increase or decrease the phase delay determined from the immediate preceding sample in order to seek maximum correlation of the PN code representative of phase correlation.

For example, in one embodiment, the synchronized PN code generator 20 may selectively increase the delay added to the PN code produced by the PN code generator 16 until initial correlation with the initial reflective signal is ascertained. Thereafter, the phase of the synchronized PN code generated by the synchronized PN code generator 20 may be added to and subsequently subtracted to by a delay or phase lock loop.

The output of the synchronized PN code generator 20 is compared to the received reflected optical or electromagnetic signal produced by the transmitter 12 and received by the receiver 14 through the use of a simple comparison counter. For example, the synchronized circuit 18 may comprise a comparator comparing the stages of plural bit shift registers, which have the received optical signal and synchronized PN code loaded therein. Thus, when a phase match is present, the output of the comparator or correlator will indicate maximum correlation and then the phase delay between the PN code transmitted and received will then be known.

Once the phase of the PN code output from the synchronized PN code generator 20 is known, a delay measurement and lateral distance calculation is performed in the delay measurement and lateral distance calculation circuit 22 to determine the phase delay between the synchronized PN code output from the synchronized PN code generator 20 and the PN code initially generated by the PN code generator 16. As the transmit and received paths are actually substantially parallel when the system is utilized in the real world, and since the speed of propagation of an optical or radio signal is well known, the distance the optical or electromagnetic signal travels may be calculated. One half of this distance is the distance between the vehicle mounted system 10 and the target or reflector 6. Thus, the system of the present application may readily calculate the distance between the vehicle on which it is mounted and the target. In a preferred embodiment, the target may be either a precisely located highway guardrail or a target, or in the case of millimeter waves which are utilized in one aspect of the present invention, a wire may be utilized as the target.

Figure 2:
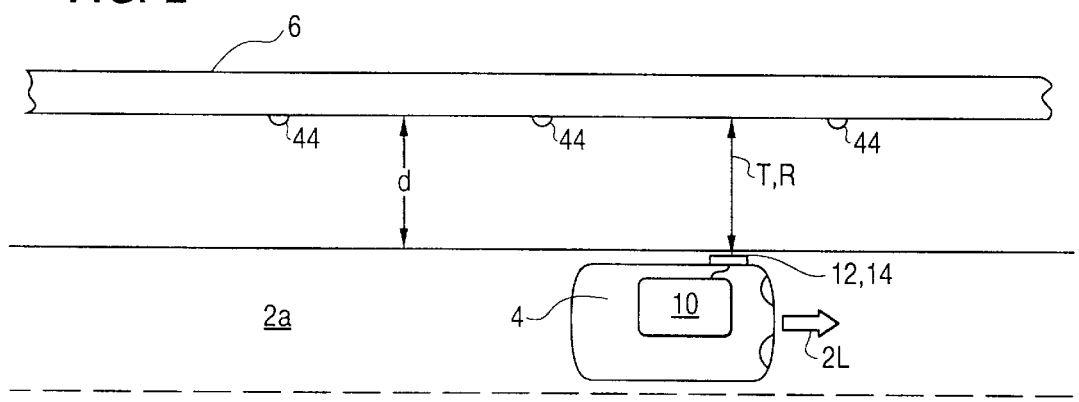
FIG. 2 is a schematic top view of a vehicle 4 travelling down a roadway 2 and communicating with a reflector and periodically located roadway transponders 44.
Figure 2:

FIG. 2 of the instant application illustrates a vehicle 4 employing a vehicle mounted system 10 having a transmitter and receiver 12,14 mounted thereon travelling a desired direction 2L along a first lane 2a of a roadway 2 having first and second lanes 2a,2b. The transmitter/receiver 12,14 of the vehicle 4 communicates with a target or reflector 6, which in one preferred embodiment may be a highway guardrail, mounted a fixed distance d from the roadway 2. Alternatively, the reflector may be a part of a tunnel or highway wall or any surface which is a consistent distance d from the roadway.

As explained with reference to FIG. 1, the transmitter and receiver transmit and reflect an optical or electromagnetic signal along a transmit and receive path T,R to the reflector 6. The transmitter/receiver may further communicate with a plurality of periodically located roadway transponders 44 which may be mounted in any desired location along the roadway. These periodically located transponders 44 may receive the optical or electromagnetic signal transmitted from the transmitter 12 of the vehicle as an interrogation signal and may transmit desired information to the vehicle in response thereto.

Alternatively, the periodically located roadway transponders 44 may be located sufficiently closely to each other along the longitudinal direction 2L and may also act to reflect the optical or electromagnetic signal transmitted by the transmitter 12 back to the receiver 14 also mounted on the vehicle 4, thereby acting as a replacement for the reflector 6.

FIG. 3 of the instant application describes further details of the embodiment of FIG. 1, which details may also be utilized to transmit data from the periodically located roadway transponder 44 to the vehicle mounted system 10.

FIG. 3 of the instant application also shows additional details of the vehicle system 10. The vehicle system 10 of FIG. 3, in one preferred embodiment, illustrates the use of an infrared LED to transmit the optical signal toward the target 6 or transponder 44 in accordance with the teachings of the instant application. The infrared LED 32 which is part of the electrical/optical converter or transmitter 12 transmits a PN code generated under control of a clock 38 also illustrated in this Figure.

The reflection of this PN code encoded optical signal is received by an infrared photo detector 34 which is part of the receiver or optical/electrical converter 14. The received PN code is then synchronized in the manner already described with reference to FIG. 1 and distance measurement is performed by a distance measurement processor 36 in substantially the same way the delay measurement and lateral distance calculation circuit 22 operates. This distance measurement processor performs delay measurement and lateral distance calculation and is equivalent to the delay measurement and lateral distance calculation circuit 22 of FIG. 1. The output of the distance measurement may be displayed on a display 40. Additionally, the output of the distance measurement may also be supplied as an output of the vehicle mounted system 10 which is then supplied to the steering system 50. The steering system 50 adjusts the vehicle steering so as to maintain the distance measurement output from the distance measurement processor 36 constant, thereby maintaining the vehicle 4 in the center of the selected lane 2a.

Another aspect of the present application allows roadway based information to be communicated to the vehicle using the receiver or optical/electrical converter 14 of the vehicle. As explained above with reference to FIG. 2, a plurality of periodically located roadway transponders 44 are provided substantially adjacent the target. Each of these periodically located roadway transponders is responsive to receipt of the PN code modulated optical signal transmitted by the transmitter of electrical/optical converter 12 which is optically received by a roadway transponder photo detector 48. Receipt of the PN modulated optical signal from the vehicle mounted system causes the periodically located roadway transponder to generate a transponder originated signal which is spread spectrum encoded and which includes data modulated therein.

This transponder originated signal includes a PN code representative of a transponder transmission which is multiplexed with data provided to a roadway transponder data input 54 using a roadway transponder signal multiplexer 56. The transponder originated signal is output from a roadway transponder infrared LED 46 for receipt by the receiver or optical/electrical converter 14 of the vehicle mounted system 10. The output of the transponder includes a PN code and an embedded data message. The PN code, in the preferred embodiment, is different from that generated by the PN1 code generator 16. The PN code PN2 of the PN2 code generator 52 is known, however, to a PN2 code synchronizer and code demodulator 42. The code will be generally the same for all transponders 44. This code demodulator functions similarly to the circuitry described in FIG. 1, recognizing the PN2 code transmitted by each periodically located roadway transponder 44 when interrogated by the PN1 encoded signal transmitted by the vehicle mounted system 10.

The roadway transponder signal multiplexer 56 is, in the preferred embodiment, a modulo 2 adder which adds the spread spectrum code to the data to produce high speed composite data. The intensity of the transmitted light wave output from the roadway transponder infrared LED 46 is thereafter directly modulated by the spread spectrum or high speed composite data. The vehicle mounted system 10 utilizes a PN code synchronizer such as that described above with respect to FIG. 1, to synchronize the known PN2 code to the PN2 code transmitted by the interrogated transponder. The synchronized PN2 code is then modulo 2 added to the received high speed composite data to recover the desired data.

Additionally, each transponder desirably has a unique ID signal associated therewith and representing the longitudinal position of the transponder along the roadway. From this signal the longitudinal position of the vehicle along the roadway may be determined. For example, each transponder may correspond to a highway milepost, the transponders being located at mileposts 27.1, 27.2, etc. Since the ID of each transponder is transmitted, the vehicle will know its position as it passes each transponder and can easily interpolate position therebetween. However, the system and method of the present application desirably determines the instant the vehicle 4 passes each transponder 44 so as to more accurately determine instantaneous vehicle position.

The determination of the instant when a vehicle 4 passes a transponder 44 is desirable to more accurately determine instantaneous vehicle location. This is accomplished through use of a passing time detector 24 which detects the accurate time of passing of the vehicle 4 in front of the transponder or wave transmitting means 44. The received signal on the receiving path R is converted to an electrical signal by optical/electrical converter 14 and lead to the passing time detector 24. Received signal takes an amplitude depending on the distance between the vehicle 4 and transponder 44, and shows maximum amplitude at the instance when the vehicle 4 passes exactly in front of the transponder 44. Passing time detector 24 utilizes the analog amplitude of the received signal, then the received signal is processed before digitized by a comparator.

Figure 3A:
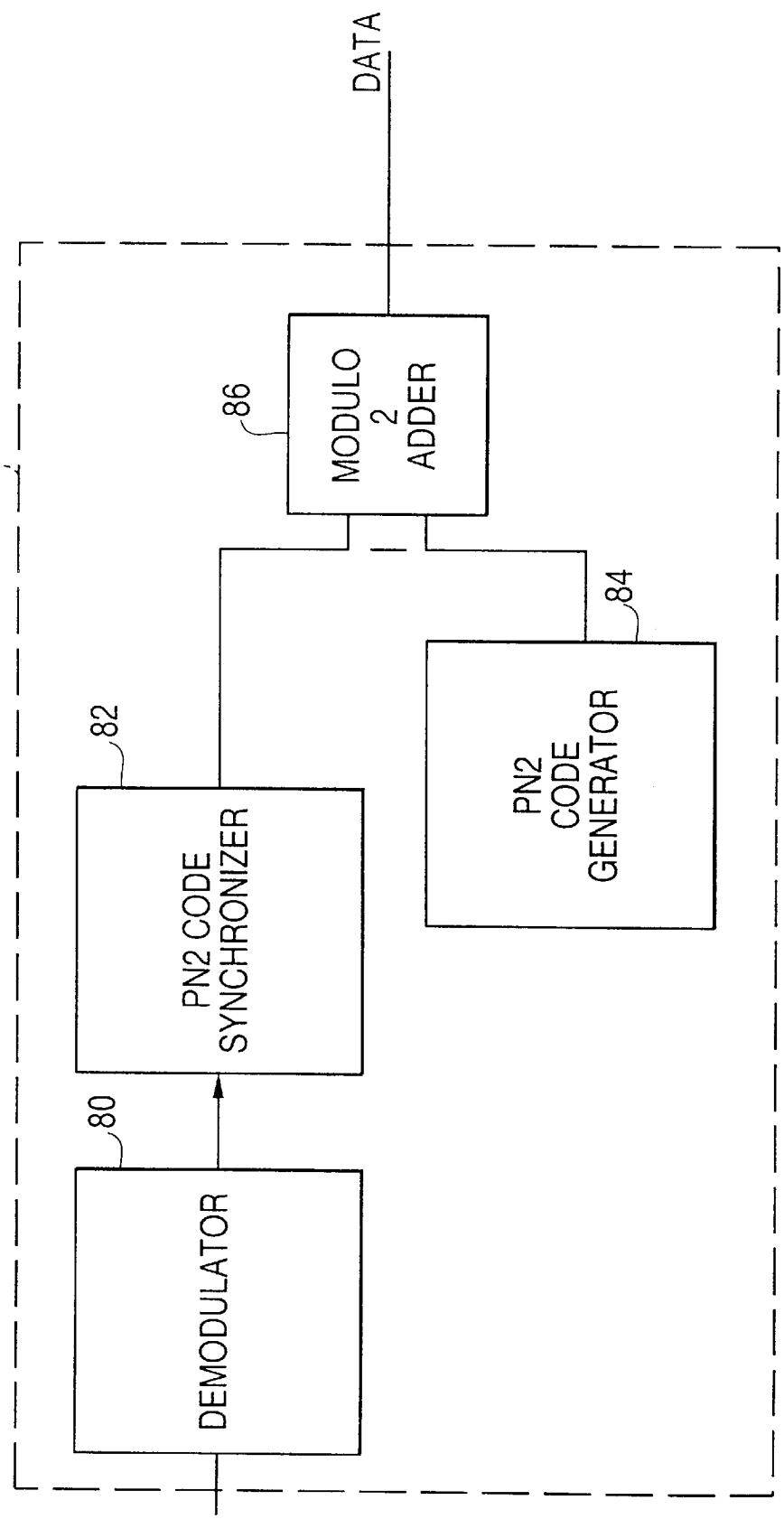
FIG. 3(a) is a schematic illustrating the detail of the PN2 code synchronizer and code demodulator 42 of FIG. 3.

FIG. 3a of the instant application illustrates further details of the PN code synchronizer and code demodulator 42 of FIG. 3. The PN code synchronizer and code demodulator 42 includes a demodulator 80 for demodulating the high speed composite data generated by the transponder modulator 58. A PN2 code synchronizer 82 which performs in the same way as the PN1 code synchronizer 20 to synchronize the PN2 code to the received signal is also provided as part of the PN code synchronizer and code demodulator 42. Once the incoming signal is synchronized to the PN code generated by a PN2 code generator 84, module 2 addition is performed by a data modulo 2 adder 86 which extracts the PN code from the modulated data. The data output therefrom is then utilized in any desired fashion. For example, this data may be highway map data, traffic condition data, GPS generated position data or any other type of data considered desirable for transmission from transponder to vehicle.

Figure 4:
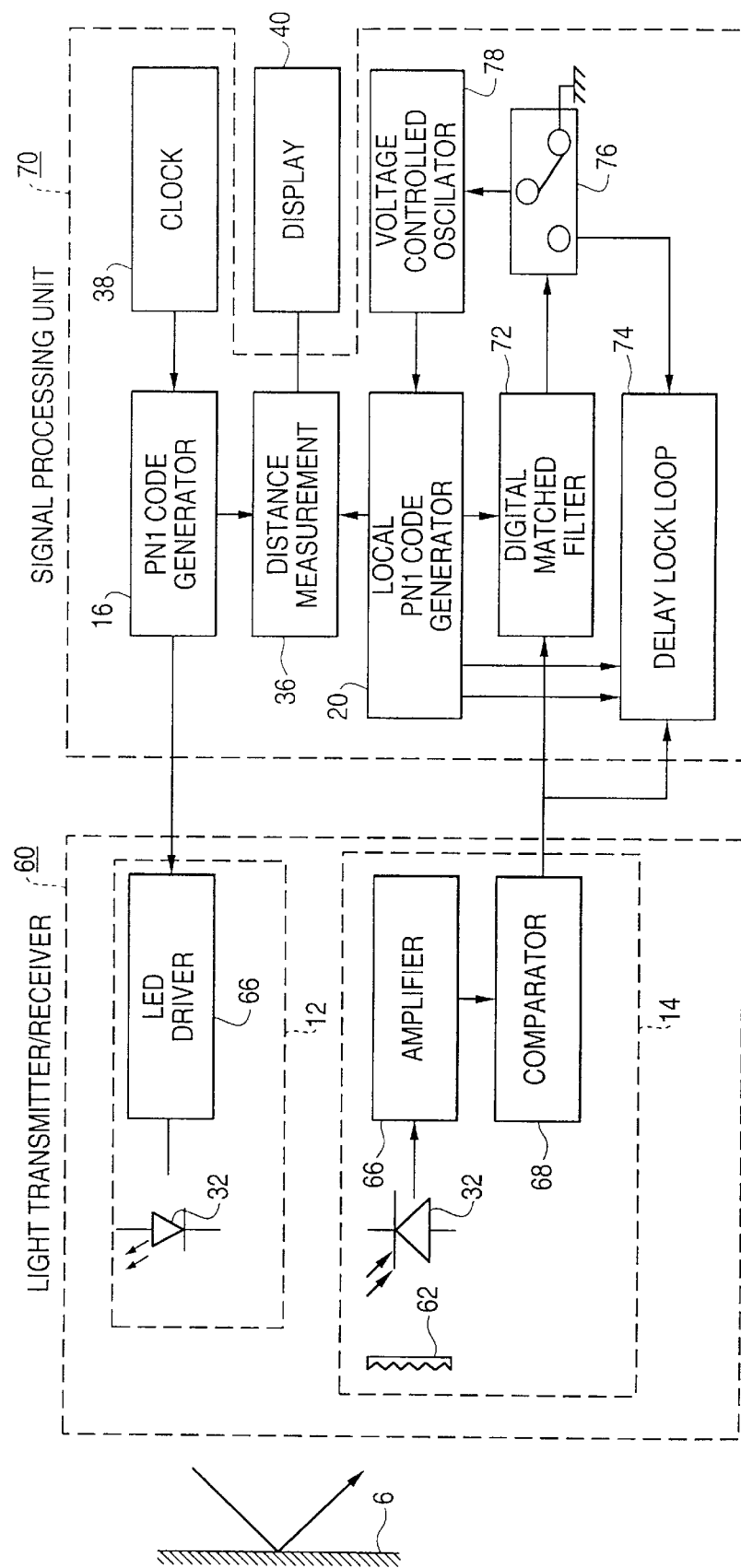
FIG. 4 is a schematic view illustrating the infrared transmission LED, photo detector and additional details of the associated signal processing circuitry used in an exemplary vehicle mounted system.

FIG. 4 of the present application describes still further details of system of the present application. The circuitry of the vehicle mounted system 10 of FIG. 1 is divided into a vehicle mounted light transmitter/receiver portion 60 and a vehicle mounted signal processing unit portion 70. The light transmitter/receiver portion 60 of the vehicle mounted system 10 includes the infrared LED 32 driven by an LED driver 64. The receiver or optical/electrical converter portion of the light transmitter/receiver portion of the vehicle mounted system includes an infrared photo detector 34 whose output is amplified by an amplifier 66 and then threshold detected by a vehicle mounted system receiver comparator 68 which compares the received signal to a threshold to square off the edges of the detected digital pulses.

The output of the comparator 68 is provided to the signal processing unit portion 70 of the vehicle mounted system 10. The signal processing unit portion 70 of FIG. 4 illustrates the synchronized PN code generator 20 and synchronized circuit 18 of FIG. 1 in greater detail. A local PN code generator 20 generates a PN1 code equivalent to that of the PN code generator 16. However, the local PN code generator 16 is not clocked by a fixed frequency clock 38, but rather, is clocked by a voltage controlled oscillator 78 which clocks the local PN code generator at a speed selected under control of the delay lock selector switch 76.

The delay lock selector switch 76 switches the control terminal of the voltage control oscillator 78 between ground during the synchronization period and a delay lock loop 74 during periods when the PN2 code produced by the local PN2 code generator 16 is locked to the PN1 code being output from the comparator 68. A digital matched filter receives the output of the comparator 68 (the signal received from the transponder) in a first register and compares that output to a PN code portion generated by the local PN2 code generator 20 which is loaded into a second register. The content of each of the bit locations of the two registers are compared in a comparison counter which generates an output representative of the degree of correlation between the PN1 code. When the contents of the register receiving a portion of the local PN code generator 16 are substantially the same as the contents of the register receiving a portion of the output of the comparator, the comparison counter monitoring the content of these two registers produces a high correlation value indicative of digital signal match.

When digital signal match is detected by the digital matched filter 72, the digital matched filter 72 controls the actuation of switch 76 to connect the delay look loop 74 to the control input of the voltage controlled oscillator 78. The delay lock loop 74 performs in a manner known to those of ordinary skill in the art and in substantially the same way as a well known phase lock loop. The delay lock loop 74 calculates the time delay needed to completely cycle the output of the comparator 68 through a register of the digital matched filter 72. Once delay lock is achieved, small control inputs are supplied to the voltage control oscillator 78 to vary the speed of generation of the local PN code to create a delay match (a kind of phase match) as is well known.

Once a delay match is accomplished, the phase delay between the local PN code generated by the local PN code generator 20 is compared to the PN code generated by PN code generator 16 to achieve a delay which is representative of 2d.

It is apparent that the system of the present invention provides a precise tracking of a vehicle along a selected roadway. As is demonstrated by the publication entitled "Lateral Distance Measurement Using Optical Spread Spectrum Radar" by the inventors of the present invention when presented at a conference on Sep. 19–21, 1997 by the Institute of Electrical and Electronic Engineers, precise control of vehicle location within a roadway lane may be accomplished by the system of the present application. Note, particularly, the experimental results obtained in this document, which is hereby incorporated by reference into the present disclosure.

It should be apparent from the aforementioned description and attached drawings that the concept of the present application may be readily applied to a variety of preferred embodiments including those disclosed herein. Accordingly, the scope of the invention described in the instant application should be limited solely by the appended claims.

We claim:

1. A system for measuring a lateral position of a vehicle along a roadway, comprising:

a wave reflector mounted adjacent to and a known distance from the roadway;

a vehicle mounted transmitter transmitting a vehicle originated interrogation signal containing a spread spectrum code toward said reflector;

a vehicle mounted receiver receiving a reflection signal containing said spread spectrum code when said vehicle originated signal is reflected from said reflector;

a comparator circuit for measuring the time difference between transmission of said vehicle originated signal by said transmitter and receipt of said reflection signal by said receiver, said comparator circuit determining the lateral distance between said vehicle and said wave reflector from said time difference.

2. The system of claim 1, further comprising;

plural transponders disposed along said roadway and transmitting information in response to interrogation;

said vehicle mounted transmitter interrogating a transponder when adjacent thereto, said vehicle mounted receiver receiving information transmitted by said interrogated transponder.

3. The system of claim 2, wherein said information transmitted by said interrogated transponder includes the vehicle time of passing said interrogated transponder.

4. The system of claim 3, wherein said system further includes a passing time detector for determining the time at which the vehicle is closest to said interrogated transponder.

5. The system of claim 2 wherein said information transmitted by said interrogated transponder includes transponder position which is representative of vehicle longitudinal position.

6. The system of claim 2, wherein each of said transponders transmits a transponder ID code uniquely identifying the transponder and its position.

7. The system of claim 1, wherein said vehicle originated spread spectrum signal having a pseudo-random noise code imbedded therein.

8. The system of claim 7 wherein said pseudo-random noise code is different for each said vehicle.

9. The system of claim 1, wherein said wave reflector also functions as a highway guardrail.

10. A system for measuring a lateral position of a vehicle along a roadway having a wave reflector disposed a known distance adjacent thereto, comprising:
   a vehicle mounted transmitter transmitting a vehicle originated interrogation signal containing a spread spectrum code toward the wave reflector;
   a vehicle mounted receiver receiving a reflection signal containing said spread spectrum code, which is obtained when said vehicle originated signal is reflected from the wave reflector;
   a comparator circuit for measuring the time difference between transmission of said vehicle originated signal by said transmitter and receipt of said reflection signal by said receiver, said comparator circuit determining the lateral distance between said vehicle and the wave reflector from said time difference.

11. The system of claim 10 wherein said roadway is provided with plural transponders disposed adjacent to the roadway and transmitting information in response to interrogation;
   said vehicle mounted transmitter interrogating a transponder when adjacent thereto, said vehicle mounted receiver receiving said information transmitted by the interrogated transponder.

12. A method of determining a vehicle's lateral position along a roadway, comprising:
   a. locating a highway guardrail substantially continuously adjacent to and a known distance from the roadway by issuing an interrogation signal containing a spread spectrum code from said vehicle to interrogate transponders disposed along said guardrail as the vehicle passes thereby; and
   b. measuring the vehicle's distance from the guardrail based on said spectrum code received from said transponders to determine the vehicle's lateral distance along said roadway.

13. In an automated highway system having a reflector spaced a known distance adjacent a roadway, a method of controlling a vehicle to follow a desired track along the roadway comprising:
   (a) determining a desired distance between the vehicle and said reflector by issuing an interrogation signal containing a spread spectrum code from said vehicle to interrogate said reflector as the vehicle passes thereby;
   (b) measuring the vehicle's distance from the reflector based on said spectrum code received from said reflector to determine the lateral distance between the vehicle and said reflector;
   (c) comparing the lateral distance measured in said step (b) to the desired distance determined in said step (a) to define a tracking error value; and
   (d) steering said vehicle based on said tracking error value to reduce said tracking error value to zero.

14. In an automated highway system usable along a roadway having transponders located adjacent thereto at intervals, each said transponder having a position identifying code, a method of communicating between the roadway system and a vehicle passing therealong and for determining the vehicle's longitudinal position along a roadway, comprising
   a. supplying each vehicle with a spread spectrum code identifying that vehicle;
   b. issuing an interrogation signal containing said spread spectrum code from said vehicle to interrogate each transponder as the vehicle passes thereby;
   c. said vehicle receiving said position identifying code transmitted by said transponder to receive roadway position information identifying the longitudinal position of said vehicle along said roadway; and
   d. transmitting additional information with said interrogation signal.

15. A system for determining a vehicle's lateral position along a roadway comprising:
   (a) a highway guardrail substantially continuously adjacent to and a known distance from the roadway; and
   (b) a spread spectrum transmitter/receiver measuring the vehicle's distance from the guardrail by by transmitting an interrogation signal containing a spread spectrum code from said vehicle to interrogate transponders on said guardrail as the vehicle passes thereby, and by receiving said spread spectrum code from said transponders to determine the lateral distance between said vehicle and said continuously adjacent guardrail at an instant in time.

16. In an automated highway system having a reflector spaced a known distance adjacent the roadway, a system for controlling a vehicle to follow a desired track along a roadway, comprising:
   means for measuring the vehicle's distance from the reflector to determine the lateral distance between the vehicle and reflector, wherein said means for measuring transmits an interrogation signal containing a spread spectrum code from said vehicle to interrogate a reflector as the vehicle passes thereby, and receives said spread spectrum code from said reflector to determine said lateral distance;
   means, operatively connected to said means for measuring, for comparing the lateral distance measured by said means for measuring to a desired distance from the reflector needed to keep the vehicle in a desired track along the roadway to define a tracking error value; and
   means, responsive to the tracking error value, for steering said vehicle to reduce said tracking error value to zero.

17. In an automated highway system usable along a roadway having transponders located adjacent thereto at intervals, each said transponder having a position identifying code, a system for communicating between the roadway system and a vehicle passing therealong and for determining the vehicle's longitudinal position along a roadway, a vehicle mounted system comprising:

a transmitter issuing an interrogation signal containing a spread spectrum code identifying the vehicle to interrogate each transponder as the vehicle passes thereby;

a receiver receiving said position identifying code transmitted by said transponder to receive roadway position information identifying the longitudinal position of said vehicle along said roadway, said receiver receiving additional information transmitted by said transponder.

* * * * *